(12) United States Patent
Wang

(10) Patent No.: US 6,907,949 B1
(45) Date of Patent: Jun. 21, 2005

(54) BATTERY POWERED MOTOR VEHICLE AND METHOD OF USE

(76) Inventor: John Baron Wang, 118 13th St., Del Mar, CA (US) 92014

( * ) Notice: Subject to any disclaimer, the term of this patent is extended or adjusted under 35 U.S.C. 154(b) by 14 days.

(21) Appl. No.: 10/877,251

(22) Filed: Jun. 25, 2004

Related U.S. Application Data

(60) Provisional application No. 60/497,037, filed on Aug. 22, 2003.

(51) Int. Cl.[7] ............................................. B60K 1/00
(52) U.S. Cl. .................... 180/65.5; 180/6.5; 180/19.1; 180/65.1; 180/6.32
(58) Field of Search ............................ 180/6.32, 6.48, 180/6.5, 19.1–19.3, 21, 65.1, 65.3, 65.5

(56) References Cited

U.S. PATENT DOCUMENTS

| | | | | |
|---|---|---|---|---|
| 4,750,578 A | * | 6/1988 | Brandenfels | ................. 180/13 |
| 4,874,055 A | * | 10/1989 | Beer | ......................... 180/65.1 |
| 5,482,125 A | * | 1/1996 | Pagett | ....................... 180/6.32 |
| 5,657,828 A | * | 8/1997 | Nagamachi | ................ 180/19.3 |
| 6,260,646 B1 | * | 7/2001 | Fernandez et al. | ......... 180/65.6 |
| 6,276,471 B1 | * | 8/2001 | Kratzenberg et al. | ...... 180/19.3 |
| 6,302,230 B1 | * | 10/2001 | Kamen et al. | .............. 180/171 |
| 6,371,228 B1 | * | 4/2002 | Husted et al. | ............. 180/65.1 |
| 6,543,564 B1 | * | 4/2003 | Kamen et al. | ........... 180/89.13 |
| 6,659,211 B2 | * | 12/2003 | Esposito | .................... 180/65.1 |

* cited by examiner

*Primary Examiner*—Lesley D. Morris
*Assistant Examiner*—L. Lum
(74) *Attorney, Agent, or Firm*—Ted Masters

(57) ABSTRACT

A battery powered motor vehicle for transporting a rider in a standing position can be steered by either selective distribution of the riders weight, or alternative by turning a steering console. By attaching a cargo rack, the battery powered motor vehicle can be converted to a hand truck for transporting cargo. In the hand truck mode, the battery powered motor vehicle can either be powered wherein the vehicle moves in reverse, or manually pushed wherein the vehicle is in a neutral state.

7 Claims, 12 Drawing Sheets

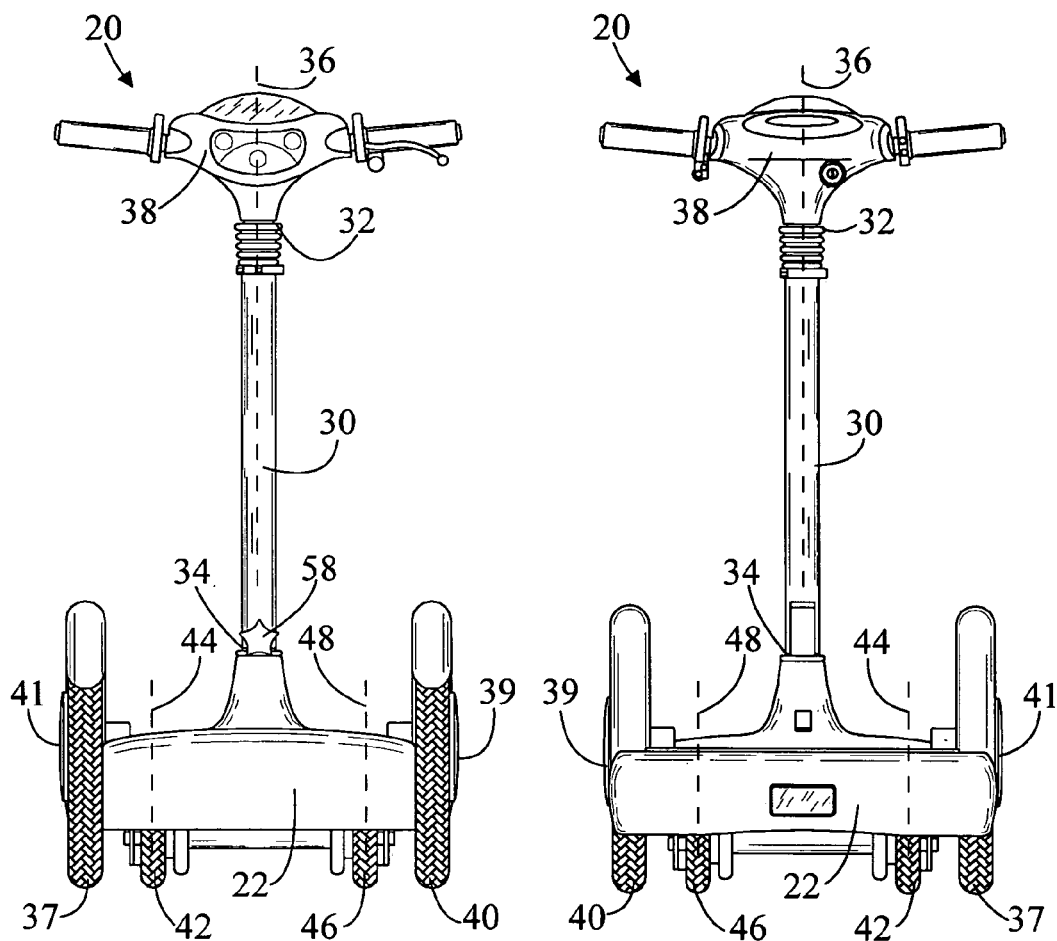
Fig_3          Fig_4

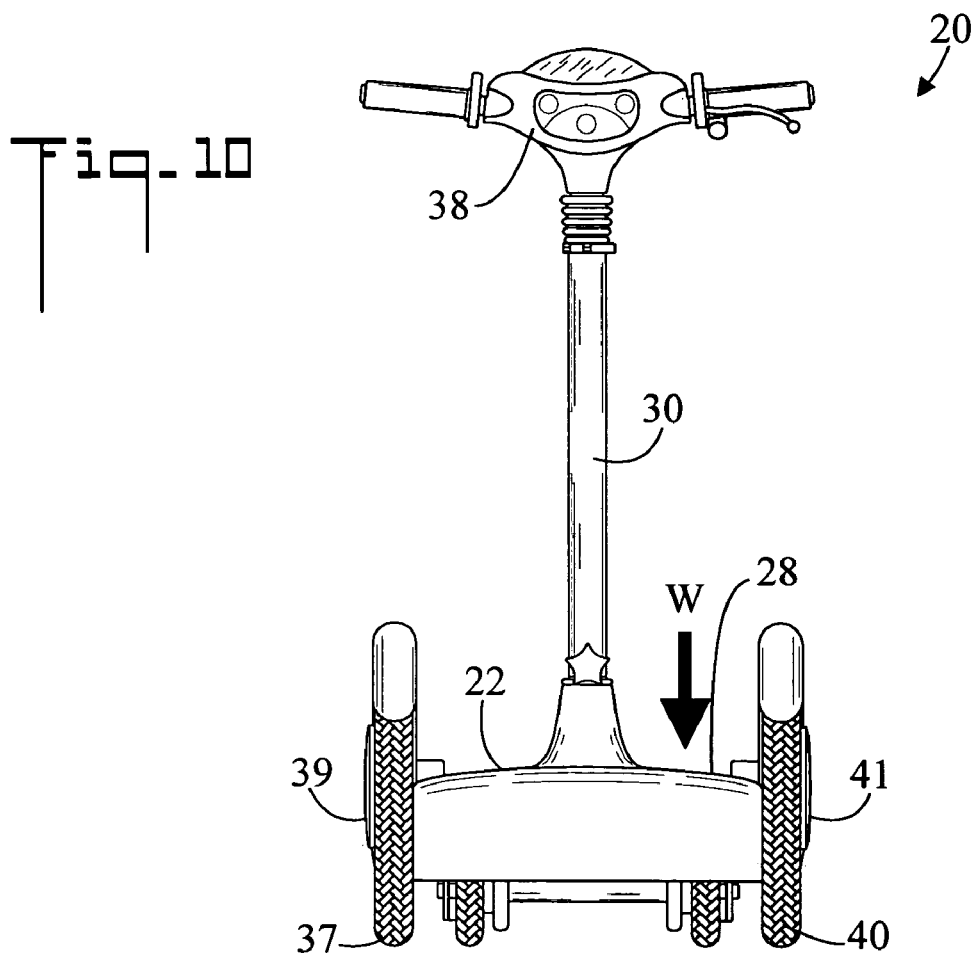
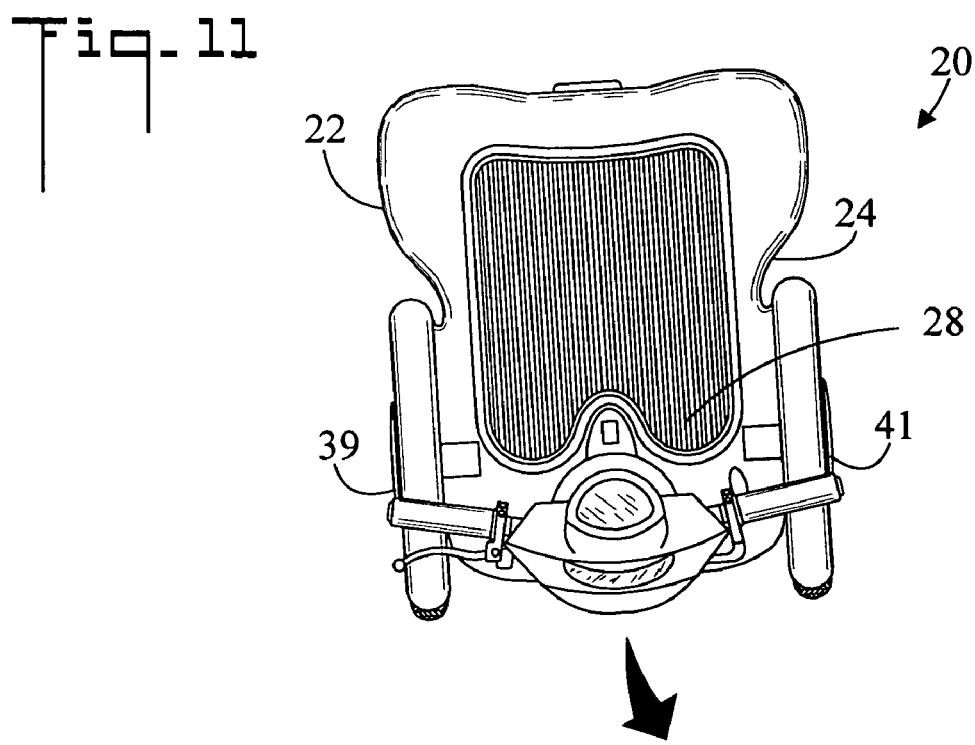

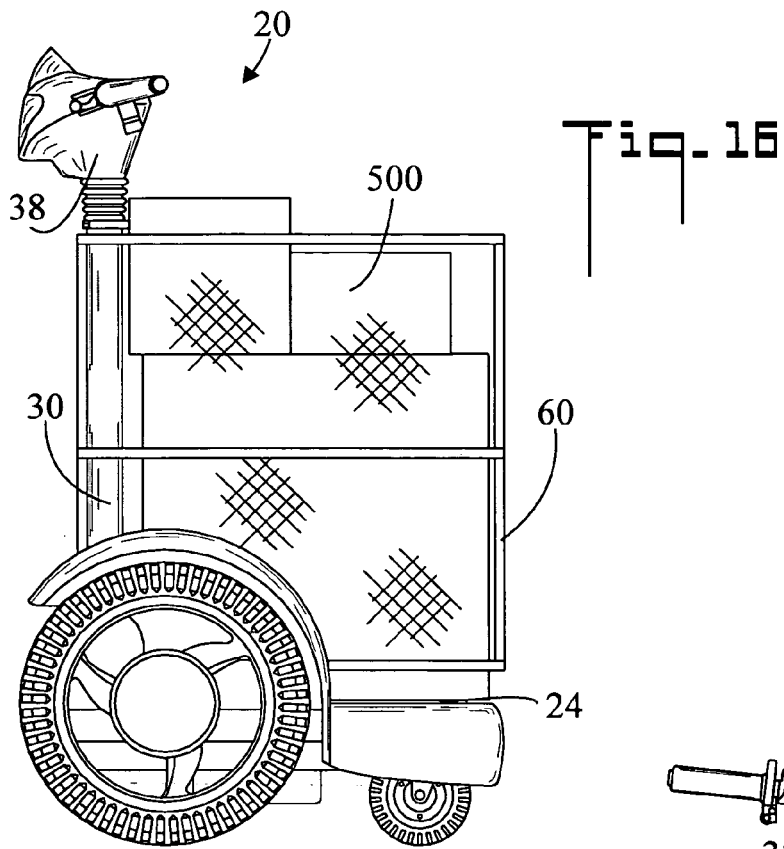
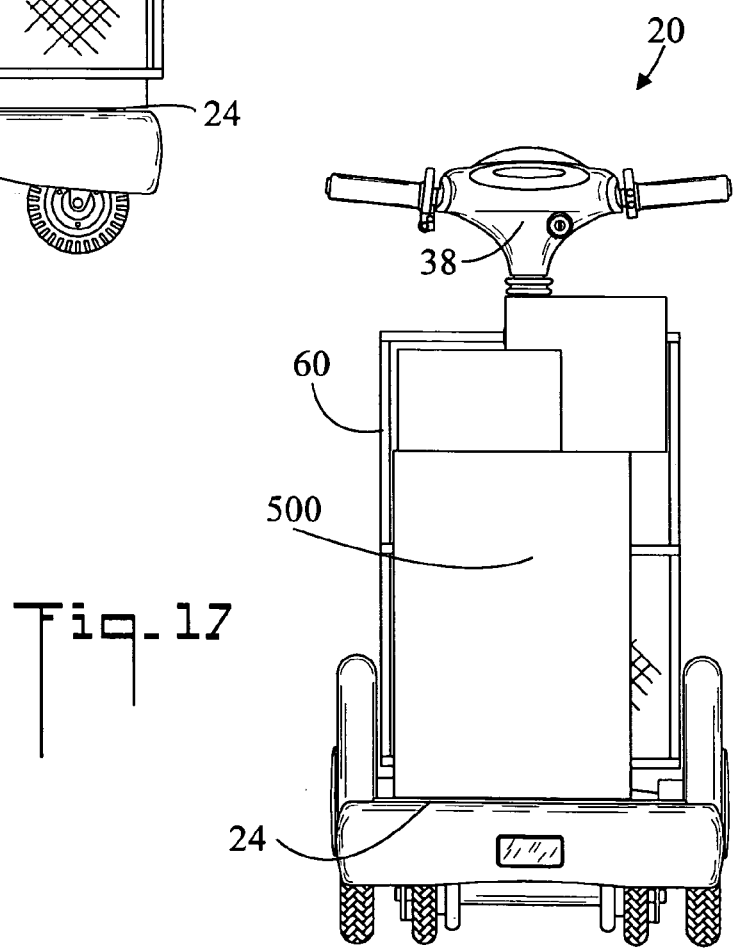

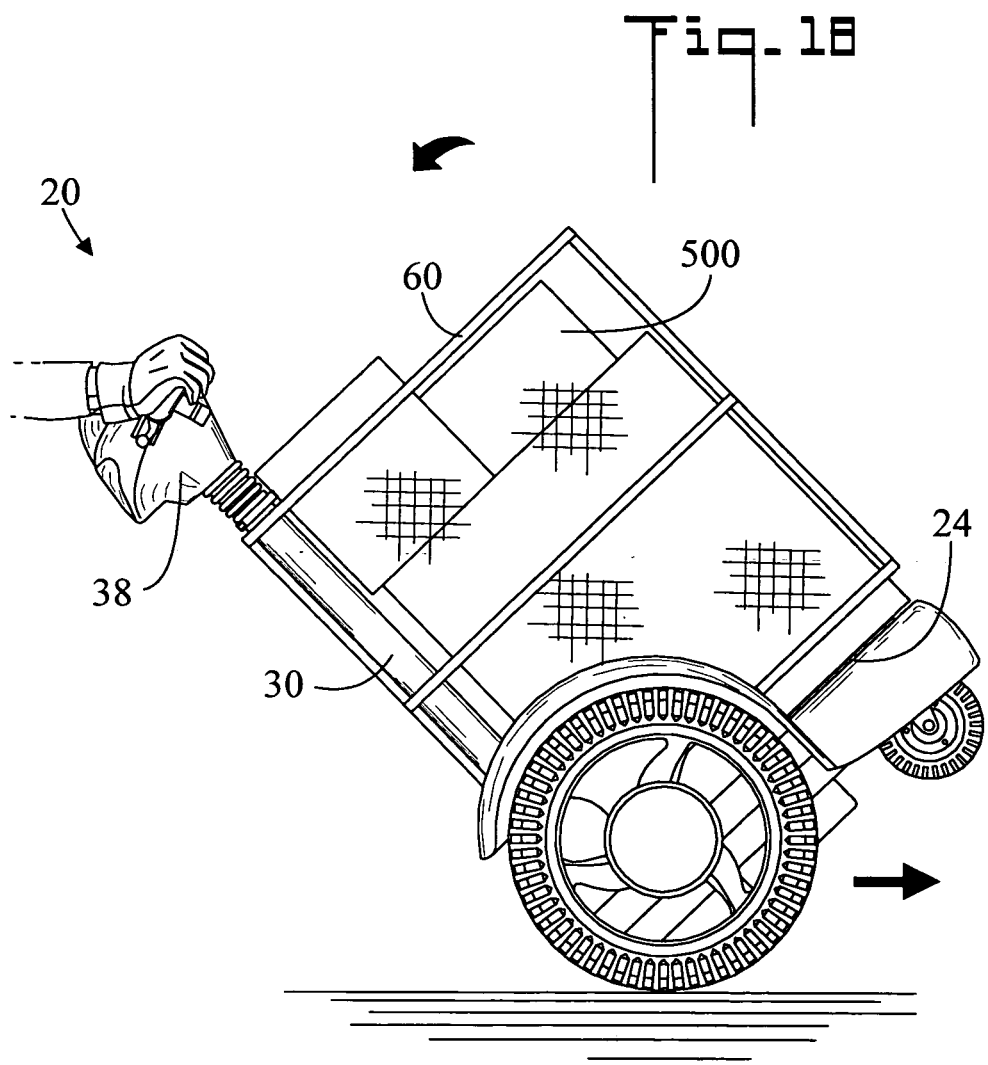

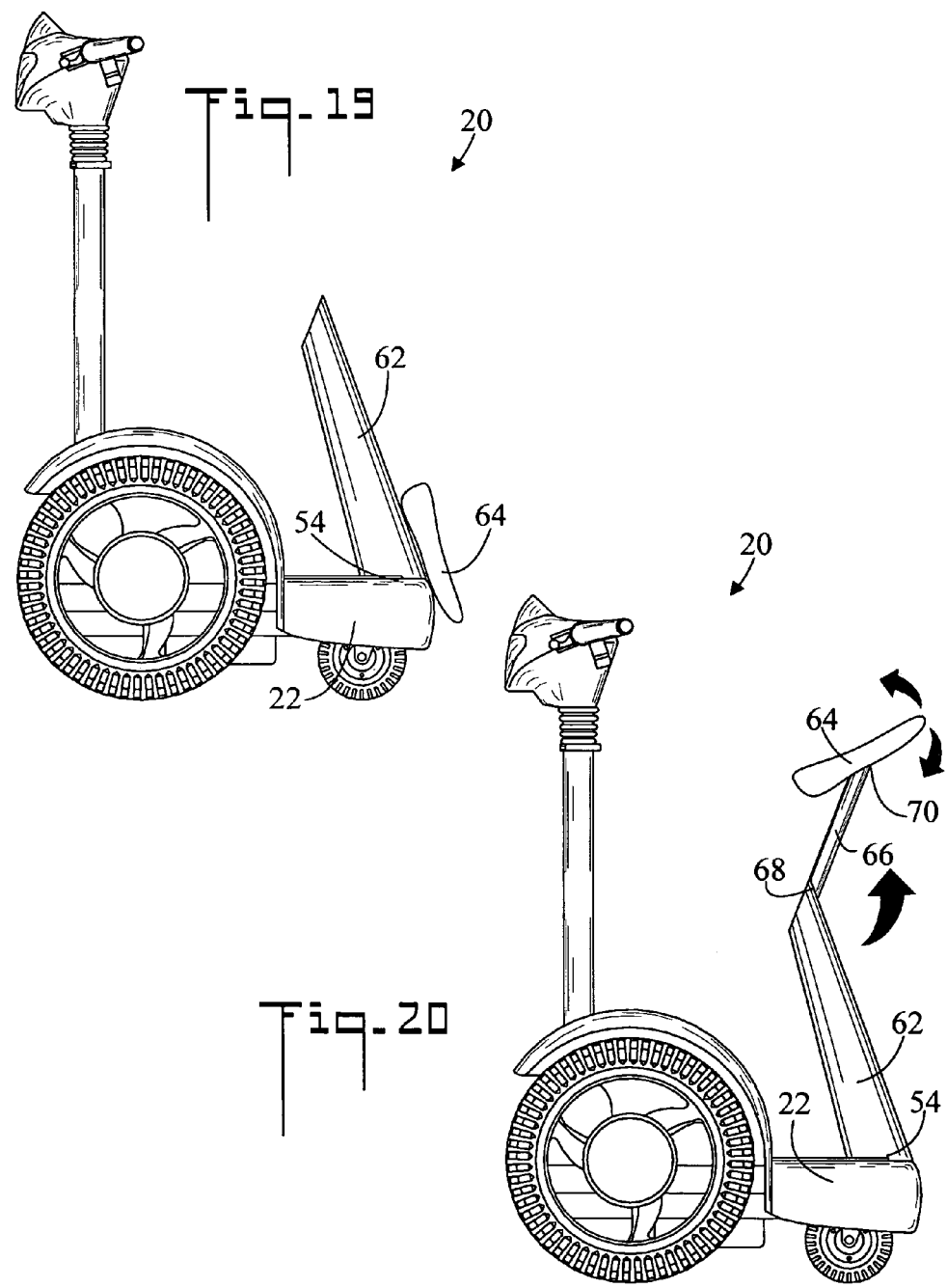

BATTERY POWERED MOTOR VEHICLE AND METHOD OF USE

CROSS REFERENCE TO RELATED APPLICATION

This application claims the filing benefit under 35 U.S.C. § 119(e) of U.S. Provisional Application No. 60/497,037, filed Aug. 22, 2003, which is included herein by reference.

TECHNICAL FIELD

The present invention pertains generally to wheeled battery powered motor vehicles for transporting people, and more particularly to a battery powered motor vehicle upon which a person stands, and which may be steered by either shifting the user's weight or by turning a steering mechanism.

BACKGROUND OF THE INVENTION

Wheeled battery powered motor vehicles for transporting a standing person are known in the art. For example, U.S. Pat. No. 6,561,294 illustrates a balancing vehicle that supports a rider on a support such as a seat in a such a manner as to allow the position of the center of gravity of the vehicle to be varied by motion of the support. Motion of the support additionally provides for control of a drive that propels the vehicle in a manner responsive to the position of the center of gravity. The vehicle is thus capable of control by leaning of a seated rider.

BRIEF SUMMARY OF THE INVENTION

The present invention is directed to a battery powered motor vehicle for transporting a rider in a standing position. The rider may steer the vehicle be either (1) leaning his/her weight to one side or the other to effect gradual turns, or (2) turning a steering console to effect sharp turns. In addition to transporting a rider, the vehicle can be converted to either a powered or unpowered hand truck for transporting cargo.

In accordance with a preferred embodiment of the invention, a battery powered motor vehicle for transporting a rider includes:

- a body having a platform for a rider to stand upon, the platform having a right side and an opposite left side;
- a steering column having a top end and an opposite bottom end, the bottom end of the steering column rotatably connected to the body, the steering column rotatable about a first vertical axis;
- a steering console is connected to the top end of the steering column;
- a right front wheel is connected to the right side of the body, the right front wheel having a right hub electric motor;
- a left front wheel connected to the left side of the body, the left front wheel having a left hub electric motor; the right hub electric motor being mechanically and electrically independent from the left hub electric motor;
- a right back wheel is rotatable about a second vertical axis;
- a left back wheel is rotatable about a third vertical axis, the left back wheel being spaced apart from and parallel to the right back wheel;
- the right and left back wheels mechanically linked to the steering column so that when the steering column is rotated to the right about the first vertical axis, the right and left back wheels rotate to the left about the second and third vertical axes respectively, and when the steering column is rotated to the left about the first vertical axis, the right and left back wheels rotate to the right about the second and third vertical axes respectively;

battery powered motor vehicle power movable in either a forward or reverse direction, wherein the right front and left front wheels are powered;

wherein when the battery powered motor vehicle is moving forward, the rider may selectively place a majority of his/her weight upon the right side of the platform, thereby causing an increased mechanical load to be placed on the right hub electric motor and a decreased mechanical load to be placed on the left hub electric motor, thereby causing the right hub electric motor to turn slower than the left hub electric motor to turn faster and the battery powered motor vehicle to turn gradually to the right;

wherein when the battery powered motor vehicle is moving forward, the rider may selectively place a majority of the his/her weight upon the left side of the platform, thereby causing an increased mechanical load to be placed on the left hub electric motor and a decreased mechanical load to be placed on the right hub electric motor, thereby causing the left hub electric motor to turn slower than the right hub electric motor to turn faster and the battery powered motor vehicle to turn gradually to the left;

wherein when the battery powered motor vehicle is moving forward, the rider may selectively turn the steering console to the right about the first vertical axis wherein the steering column rotates to the right causing the right and left back wheels to rotate to the left about the second and third vertical axes respectively, thereby causing the battery powered motor vehicle to turn sharply to the right; and, wherein when battery powered motor vehicle is moving forward, the rider may selectively turn the steering console to the left about the first vertical axis wherein the steering column rotates to the left causing the right and left back wheels to rotate to the right about the second and third vertical axes respectively, thereby causing the battery powered motor vehicle to turn sharply turn to the left.

In another preferred embodiment of the invention, battery powered motor vehicle may be converted into either a powered or unpowered hand truck by the addition of a cargo rack. The cargo rack has wire mesh sides to keep the cargo in place. When the cargo rack is connected to battery powered motor vehicle, a user may (1) place the cargo upon platform, (2) tilt the battery powered motor vehicle so that the right and the left back wheels are off of the ground, (3) grasp the steering console and cause the battery powered motor vehicle to move in a reverse direction, and (4) walk behind the battery powered motor vehicle to transport the cargo to a desired location. Alternatively, the user may place the battery powered motor vehicle in a neutral state and manually push the battery powered motor vehicle such as is done with a conventional hand truck.

Other aspects of the present invention will become apparent from the following detailed description, taken in conjunction with the accompanying drawings, which illustrate, by way of example, the principles of the invention.

BRIEF DESCRIPTION OF THE DRAWINGS

FIG. 3 is a front elevation view of the battery powered motor vehicle;

FIG. 4 is a rear elevation view of the battery powered motor vehicle;

FIG. 10 is a front elevation view of the battery powered motor vehicle showing the rider's weight being placed on the left side of the battery powered motor vehicle's platform;

FIG. 11 is a top plan view of the battery powered motor vehicle gradually turning to the left;

FIG. 16 is a side elevation view of the battery powered motor vehicle with a cargo rack installed and loaded with cargo;

FIG. 17 is a rear elevation view of the battery powered motor vehicle with a cargo rack installed and loaded with cargo;

FIG. 18 is a side elevation view of the battery powered motor vehicle moving cargo;

FIG. 19 is a side elevation view of the battery powered motor vehicle with a seat support showing a seat in a undeployed downward position;

FIG. 20 is a side elevation view of the battery powered motor vehicle with the seat support showing the seat in an deployed upward position; and, FIG. 21 is a side elevation view of a rider in a standing position riding the battery powered motor vehicle.

DETAILED DESCRIPTION OF THE INVENTION

Figure 21:
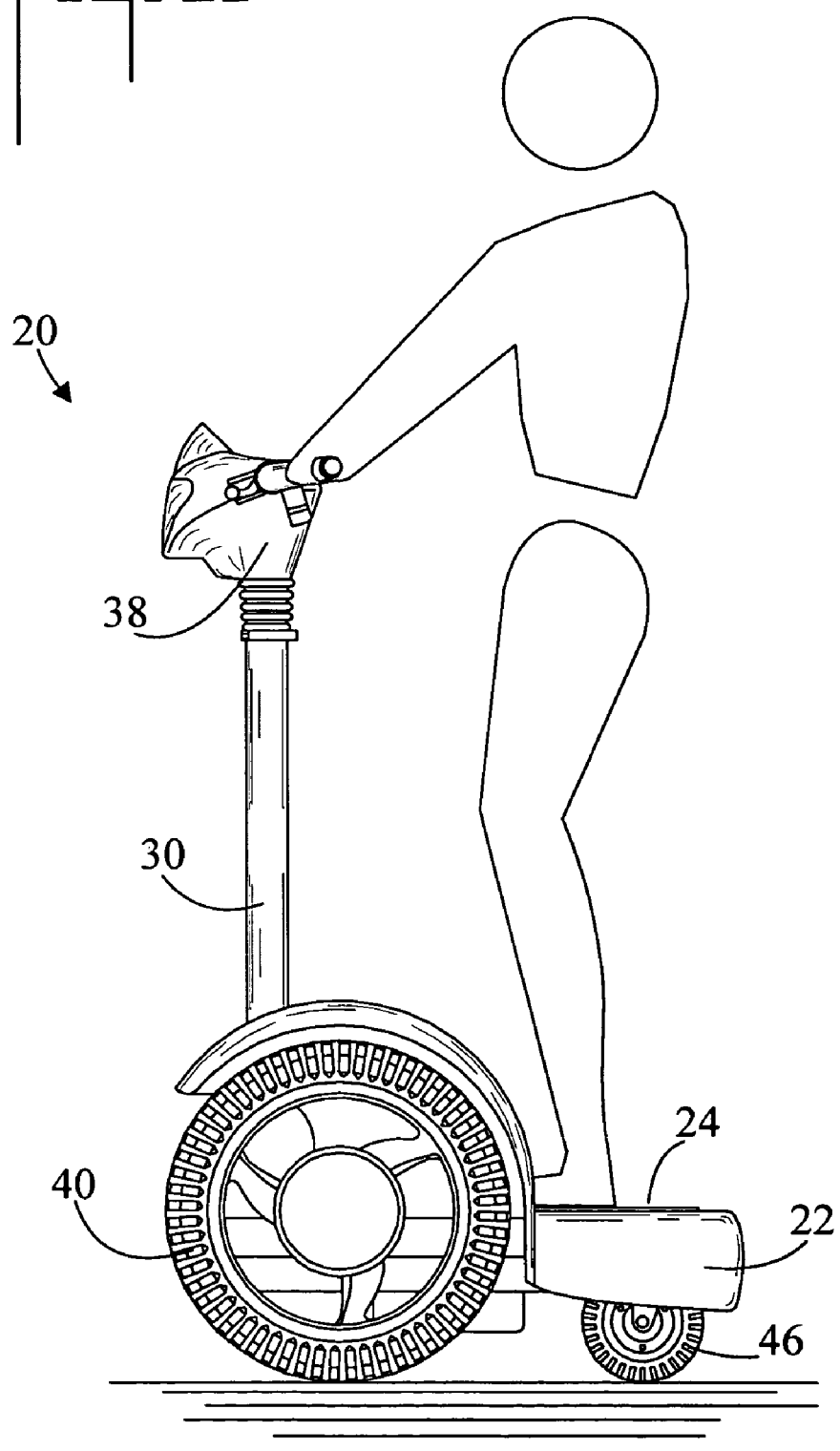

Referring initially to FIGS. 1–6, there are illustrated side elevation, top plan, front elevation, rear elevation, opposite side elevation, and bottom plan views respectively of a battery powered motor vehicle for transporting a rider, generally designated as 20. FIG. 21 shows a rider being transported by battery powered motor vehicle 20. Battery powered motor vehicle 20 includes a body 22 having a platform 24 for a rider to stand upon, platform 24 having a right side 26 and an opposite left side 28, and being partially covered by a non-slip mat. Battery powered motor vehicle 20 further includes a steering column 30 having a top end 32 and an opposite bottom end 34, bottom end 34 of steering column 30 is rotatably connected to body 22 wherein steering column 30 rotates about a first vertical axis 36. A steering console 38 is connected to top end 32 of steering column 30.

Figure 1:
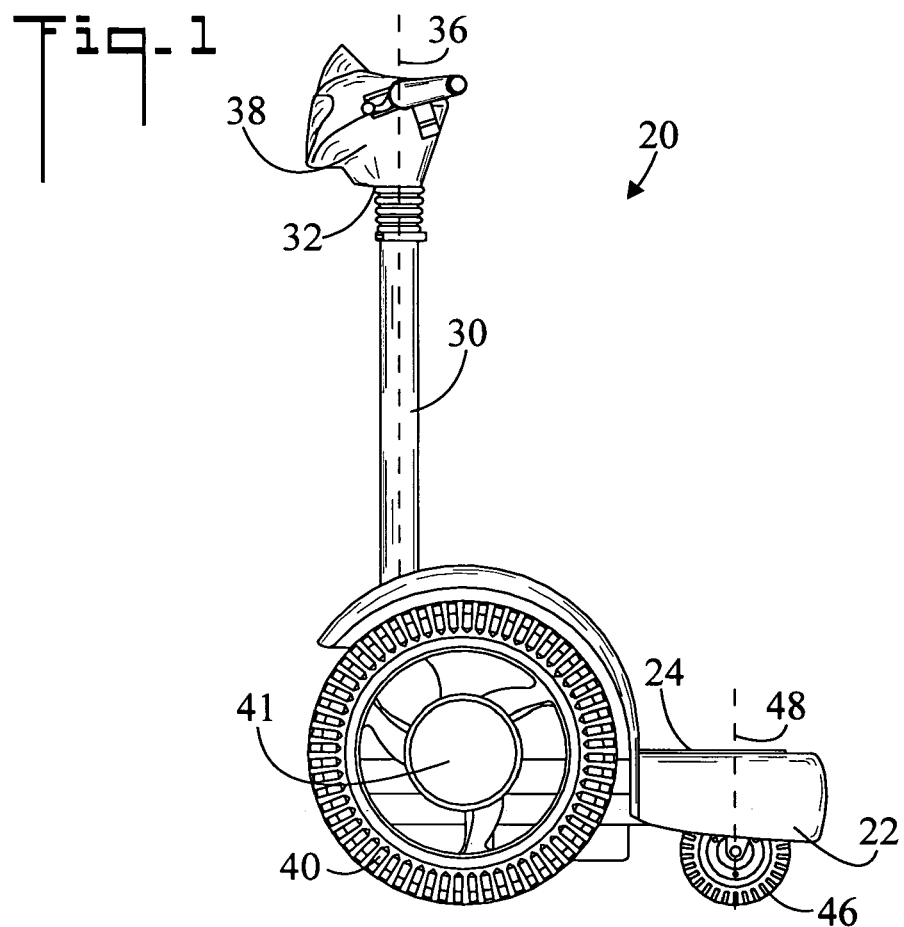
FIG. 1 is a side elevation view of a battery powered motor vehicle in accordance with the present invention.
Figure 2:
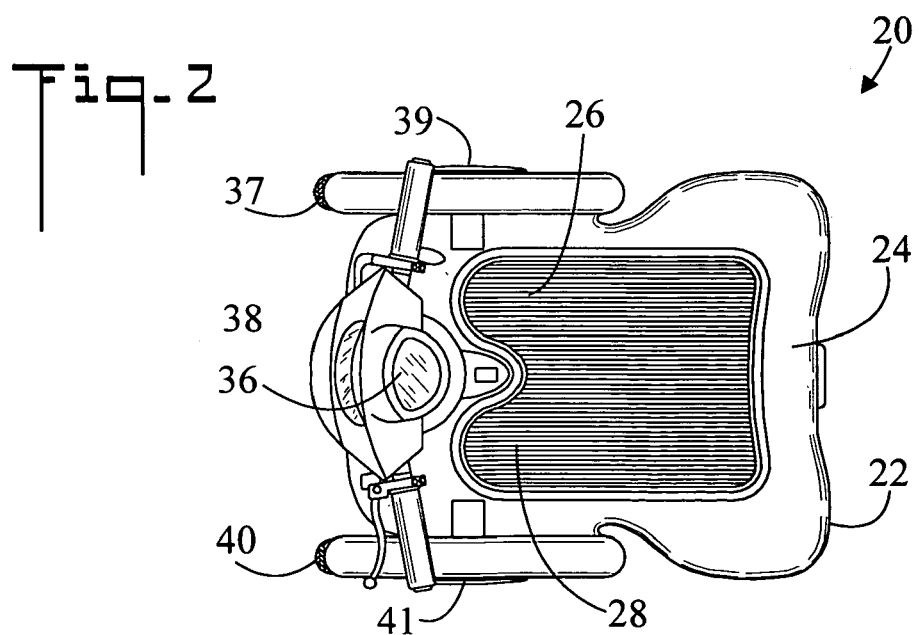
FIG. 2 is a top plan view of the battery powered motor vehicle.
Figure 5:
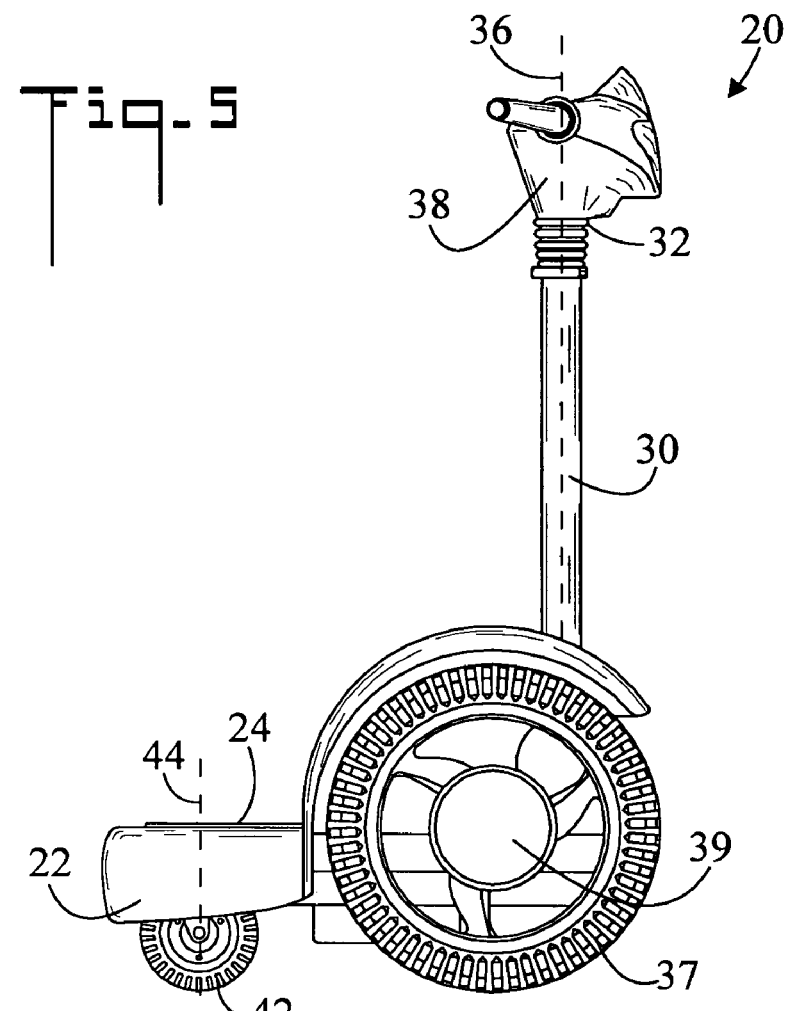
FIG. 5 is an opposite side elevation view of the battery powered motor vehicle.
Figure 6:
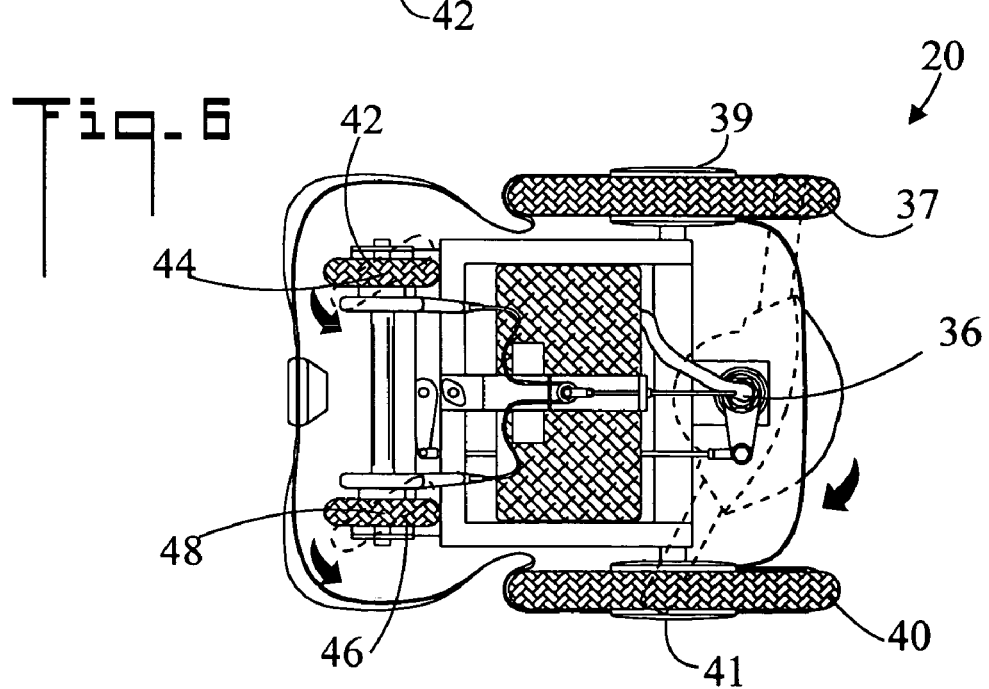
FIG. 6 is a bottom plan view of the battery powered motor vehicle.
Figure 7:
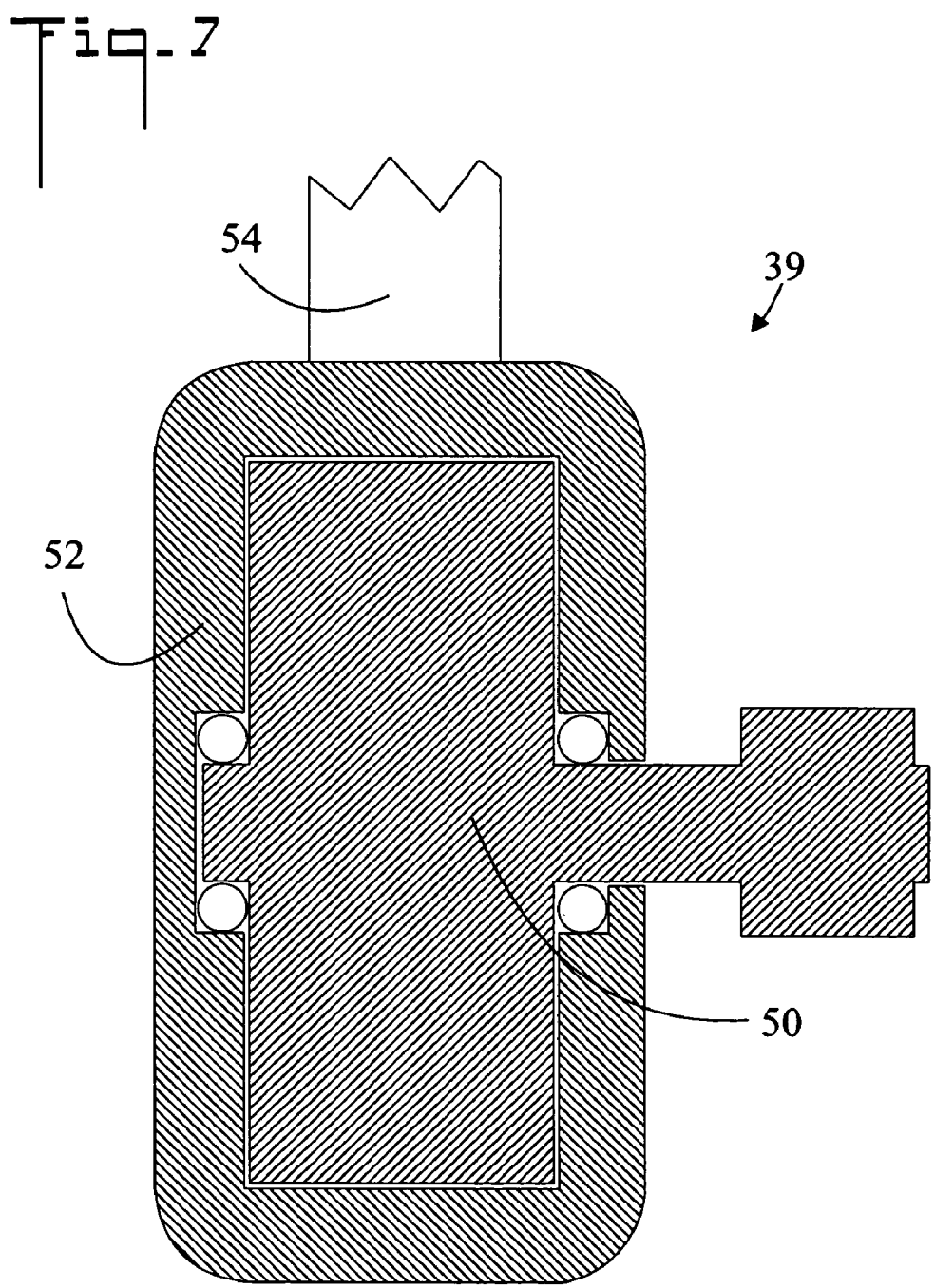
FIG. 7 is an enlarged simplified cross sectional view of a hub motor.

A right front wheel 37 is connected to right side 26 of body 22, right front wheel 37 having a right hub electric motor 39 (refer also to FIG. 7). A left front wheel 40 is connected to left side 28 of body 22, left front wheel 40 having a left hub electric motor 41. Right hub electric motor 39 is mechanically and electrically independent from left hub electric motor 41. That is, right 39 and left 41 hub electrical motors have no common axle and each is independently electrically driven. A right back wheel 42 is rotatable about a second vertical axis 44, and a left back wheel 46 is rotatable about a third vertical axis 48. Left back wheel 46 is spaced apart from and parallel to right back wheel 42. Right 42 and left 46 back wheels are mechanically linked to steering column 30, so that when steering column 30 is rotated to the right about first vertical axis 36, right 42 and left 46 back wheels rotate to the left about second 44 and third 46 vertical axes respectively (refer to FIG. 12), and when steering column 30 is rotated to the left about first vertical axis 36, right 42 and left 46 back wheels rotate to the right about second 44 and third 46 vertical axes respectively (refer to FIG. 13).

Battery powered motor vehicle 20 is power movable in either a forward or reverse direction. Power movable means being moved by delivering electrical power to right 37 and left 40.

Figure 8:
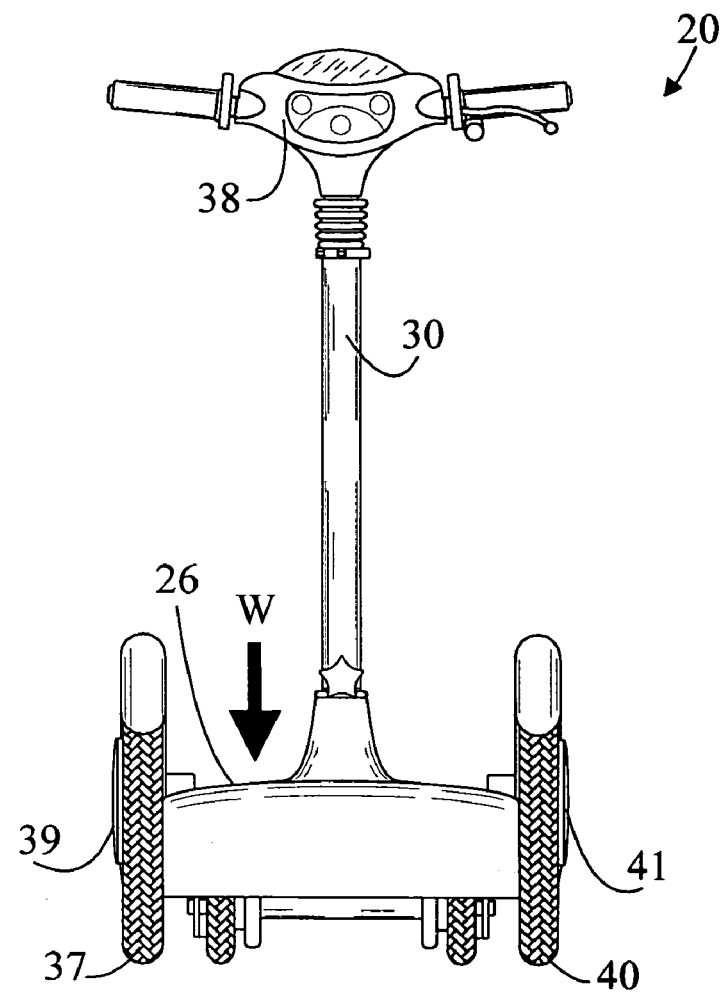
FIG. 8 is a front elevation view of the battery powered motor vehicle showing the rider's weight being placed on the right side of the battery powered motor vehicle's platform.
Figure 9:
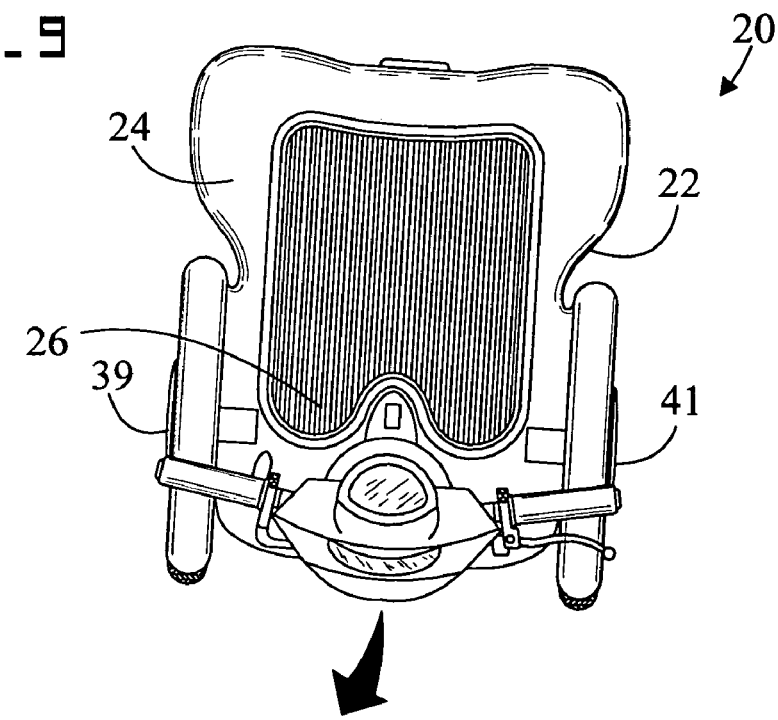
FIG. 9 is a top plan view of the battery powered motor vehicle gradually turning to the right.

Now also referring to FIGS. 8 and 9, when battery powered motor vehicle 20 is moving forward, the rider may selectively place a majority of his/her weight upon right side 26 of platform 24 thereby causing an increased mechanical load to be placed on right hub electric motor 39 and a decreased mechanical load to be placed on left hub electric motor 41, thereby causing battery powered motor vehicle 20 to turn gradually to the right. As defined herein, "to turn gradually" means that it takes battery powered motor vehicle 20 more than two body lengths of forward motion to turn 90°. Now referring to FIGS. 10 and 11, when battery powered motor vehicle 20 is moving forward, the rider may selectively place a preponderance of the his/her weight upon left side 28 of platform 24, thereby causing an increased mechanical load to be placed on left hub electric motor 41 and a decreased mechanical load to be placed on right hub electric motor 39, thereby causing battery powered motor vehicle 20 to turn gradually to the left.

Figure 12:
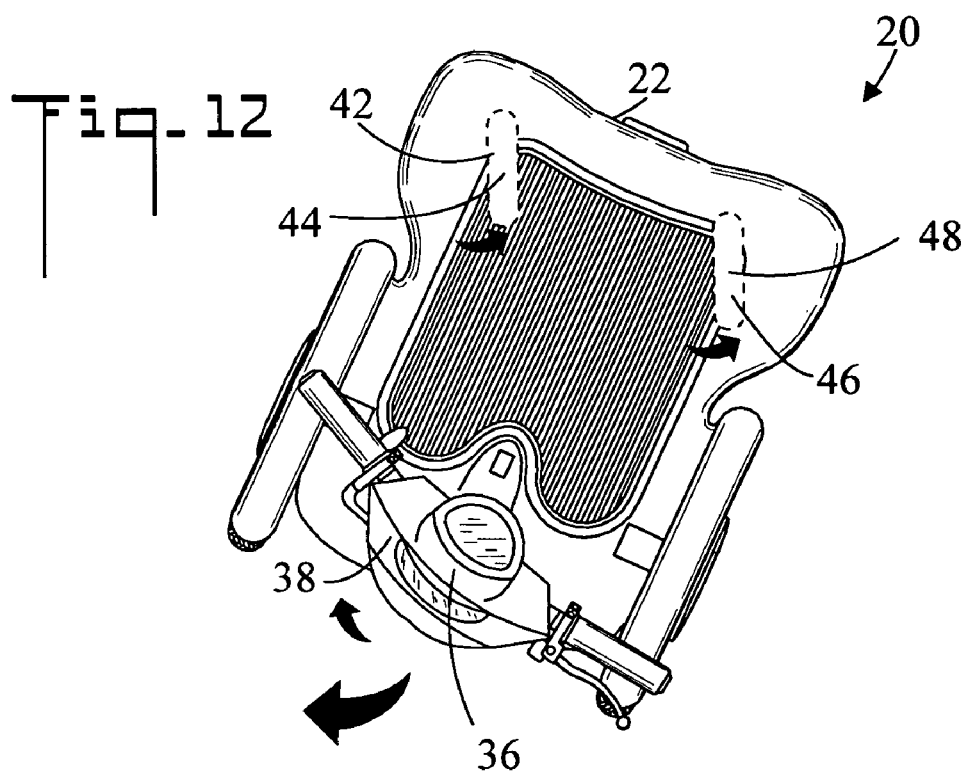
FIG. 12 is a top plan view of the battery powered motor vehicle's steering console turned to the right, the back wheels resultantly turned to the left, and the battery powered motor vehicle sharply turning to the right.

Now referring to FIG. 12, when battery powered motor vehicle 20 is moving forward, the rider may selectively turn steering console 38 to the right wherein steering column 30 rotates to the right about first vertical axis 36 (refer to FIG. 1) causing right 42 and left 46 back wheels to rotate to the left about second 44 and third 48 vertical axes respectively, thereby causing battery powered motor vehicle 20 to turn sharply to the right. As defined herein, "to turn sharply" means that it takes the vehicle no more than two body lengths of forward motion to turn 90°. And when battery powered motor vehicle 20 is moving forward, the rider may selectively turn steering console 38 to the left wherein steering column 30 rotates to the left about first vertical axis 36 (refer to FIG. 1) causing right 42 and left 46 back wheels to rotate to the right, thereby causing battery powered motor vehicle 20 to turn sharply turn to the left.

FIG. 7 is an enlarged simplified cross sectional view of right hub motor 39. Right hub motor 39 includes a stator 50 which is fixedly attached to body 22, and a rotor 52 which is attached to right front wheel 37 by a spoke 54. Right hub motor 39 receives power from a rechargeable lithium battery which is controlled by an accelerator control disposed on steering console 38.

FIG. 8 is a front elevation view of battery powered motor vehicle 20 showing the rider's weight being placed on the right side 26 of the battery powered motor vehicle's platform 24.

FIG. 9 is a top plan view of battery powered motor vehicle 20 gradually turning to the right.

FIG. 10 is a front elevation view of the battery powered motor vehicle 20 showing the rider's weight being placed on the left side 28 of the battery powered motor vehicle's platform 24.

FIG. 11 is a top plan view of the battery powered motor vehicle 20 gradually turning to the left.

FIG. 12 is a top plan view of the battery powered motor vehicle's steering console 38 turned to the right, back wheels 42 and 46 resultantly turned to the left, and battery powered motor vehicle 20 sharply turning to the right.

Figure 13:
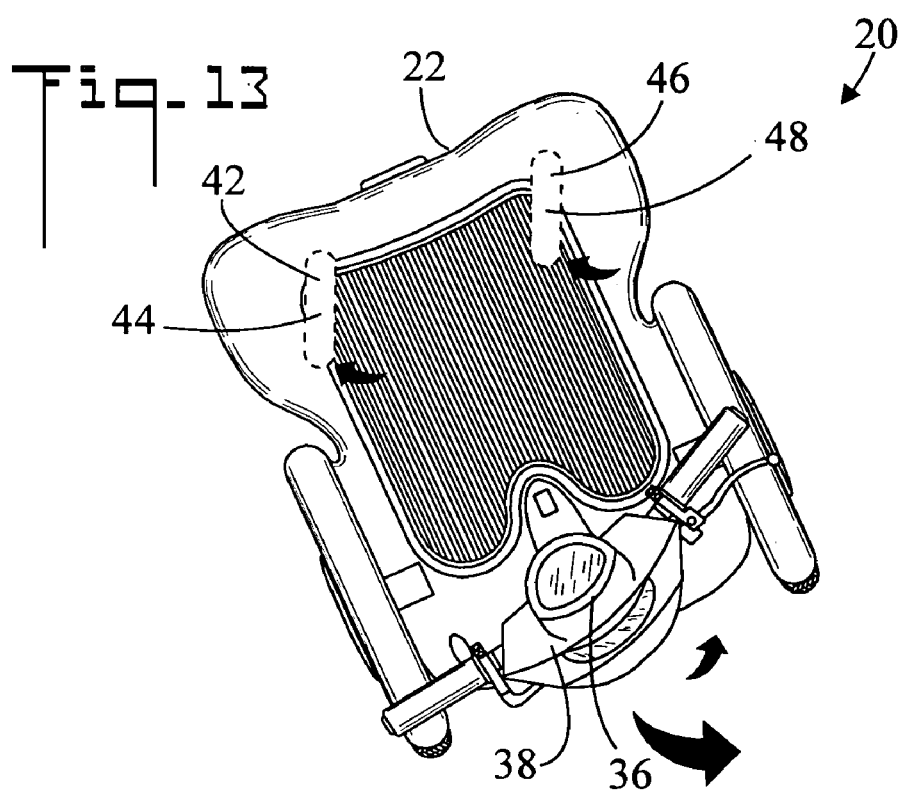
FIG. 13 is a top plan view of the battery powered motor vehicle's steering console turned to the left, the back wheels resultantly turned to the right, and the battery powered motor vehicle sharply turning to the left.

FIG. 13 is a top plan view of the battery powered motor vehicle's steering console 38 turned to the left, back wheels 42 and 46 resultantly turned to the right, and battery powered motor vehicle 20 sharply turning to the left.

Figure 14:
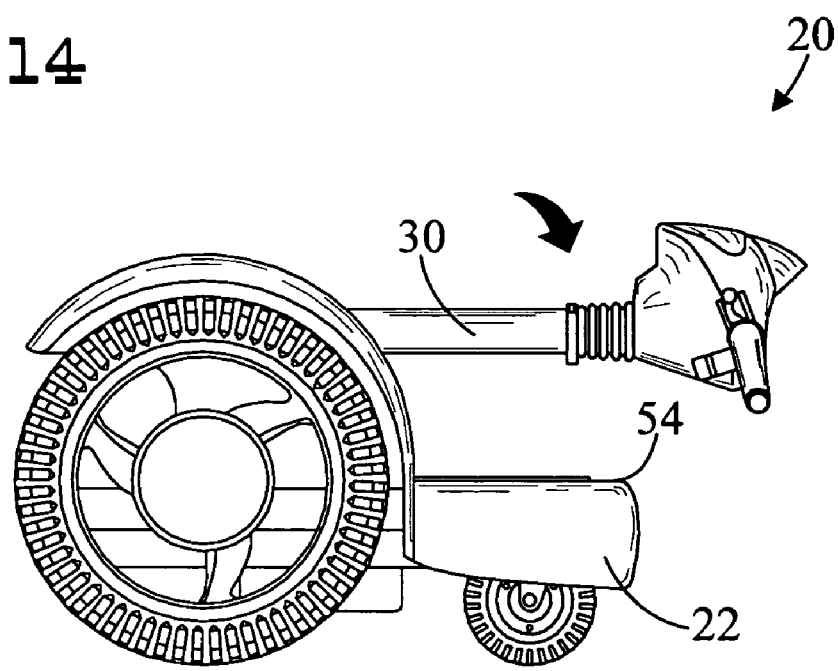
FIG. 14 is a side elevation view of the battery powered motor vehicle placed in a storage and shipping/storage configuration.
Figure 15:
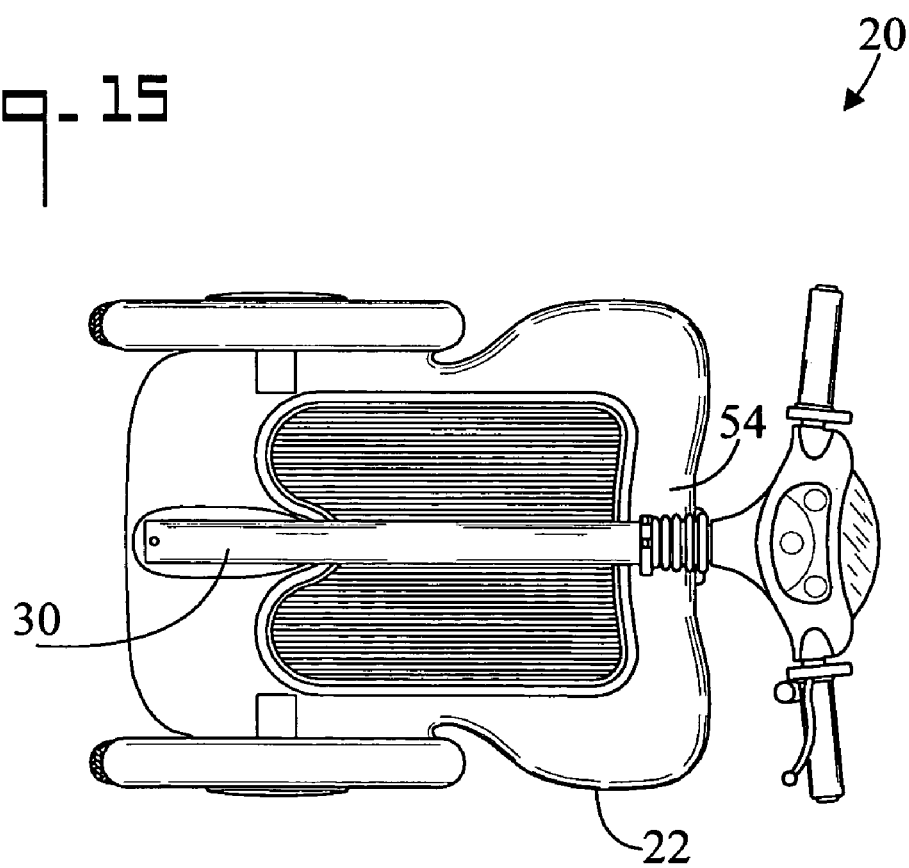
FIG. 15 is a top plan view of the battery powered motor vehicle in the storage and shipping/storage configuration.

FIGS. 14 and 15 are side elevation and top plan views respectively of battery powered motor vehicle 20 placed in a storage and shipping configuration. Body 22 has a rear portion 56. When battery powered motor vehicle 20 is not moving, steering column 30 is selectively positionable with respect to body 22 from a substantially vertical position (refer to FIG. 1) to a substantially horizontal position wherein steering column 38 is directed toward rear portion 56 of body 22. Steering column 30 is released by removing a threaded pin 58 (refer to FIG. 3) which holds steering column 30 in the horizontal position.

FIGS. 16 and 17 are side elevation and rear elevation views respectively of battery powered motor vehicle 20 with a cargo rack 60 installed and loaded with cargo 500, and FIG. 18 is a side elevation view of battery powered motor vehicle 20 moving cargo 500. Cargo rack 60 is selectively connectable to battery powered motor vehicle 20 for converting battery powered motor vehicle 20 into a hand truck. In the shown embodiment cargo rack 60 has wire mesh sides to keep cargo 500 in place. Also in the shown embodiment, cargo rack 60 is attached to steering column 30. When cargo rack 60 is connected to battery powered motor vehicle 20, a user may (1) place cargo 500 upon platform 24, (2) tilt battery powered motor vehicle 20 so that right 42 and left 46 back wheels are off of the ground, (3) grasp steering console 38 and cause battery powered motor vehicle 20 to move in a reverse direction, and (4) walk behind battery powered motor vehicle 20 to transport cargo 500 to a desired location.

FIG. 19 is a side elevation view of battery powered motor vehicle 20 with a seat support 62 disposed on rear portion 54 of body 22, and showing a seat 64 in a undeployed downward position. And, FIG. 20 is a side elevation view of battery powered motor vehicle 20 with showing seat 64 in an deployed upward position. Seat support 62 extends upward from rear portion 54 of body 22. A seat column 66 has a first end 68 and an opposite second end 70, first end 68 pivotally connected to seat support 62. Seat 64 is pivotally connected to second end 70 of seat column 66. Seat column 66 may be selectively pivoted from a downward orientation (FIG. 19) to an upward orientation (FIG. 20) wherein a user may sit upon seat 64 while he/she is riding battery powered motor vehicle 20. Additionally, seat 64 rotates about second end 70 of seat column 66 to accommodate the motion of the rider.

FIG. 21 is a side elevation view of a rider in a standing position riding battery powered motor vehicle 20.

In terms of use, a method for steering a battery powered motor vehicle 20 includes:

(a) providing the battery powered motor vehicle 20 including:
   a body 22 having a platform 24 for a rider to stand upon, platform 24 having a right side 26 and an opposite left side 28;
   a steering column 30 having a top end 32 and an opposite bottom end 34, bottom end 34 of steering column 30 rotatably connected to body 22, and steering column 30 rotatable about a first vertical axis 36.
   a steering console 38 connected to top end 32 of steering column 30;
   a right front wheel 37 connected to right side 26 of body 22, right front wheel 37 having a right hub electric motor 39;
   a left front wheel 40 connected to left side 28 of body 22, left front wheel 40 having a left hub electric motor 41; right hub electric 39 motor mechanically and electrically independent from left hub electric motor 41;
   a right back wheel 42 rotatable about a second vertical axis 44;
   a left back wheel 46 rotatable about a third vertical axis 48, left back wheel 46 spaced apart from and parallel to right back wheel 42;
   right 42 and left 46 back wheels mechanically linked to steering column 30 so that when steering column 30 is rotated to the right about first vertical axis 36, right 42 and left back 46 wheels rotate to the left about second 44 and third 48 vertical axes respectively, and when steering column 30 is rotated to the left about first vertical axis 36, right 42 and left 46 back wheels rotate to the right about second 44 and third 48 vertical axes respectively;
   battery powered motor vehicle 20 power movable in either a forward or reverse direction;

(b) causing battery powered motor vehicle 20 to move in the forward direction;

(c) the rider performing at least one of the following four maneuvers:
   (1) placing a majority of the riders's weight W upon right side 26 of platform 24 thereby causing an increased mechanical load to be placed on right hub electric motor 39 and a decreased mechanical load to be placed on left hub electric motor 41, thereby causing battery powered motor vehicle 20 to turn gradually to the right;
   (2) placing a majority of the riders's weight W upon left side 28 of platform 24, thereby causing an increased mechanical load to be placed on left hub electric motor 41 and a decreased mechanical load to be placed on right hub electric motor 39, thereby causing battery powered motor vehicle 20 to turn gradually to the left;
   (3) turning steering console 38 to the right wherein steering column 30 rotates to the right causing right 42 and left 46 back wheels to rotate to the left about second 44 and third 48 vertical axes respectively, thereby causing battery powered motor vehicle 20 to turn sharply to the right; and, (4) turning said steering console 38 to the left wherein steering column 30 rotates to the left causing right 42 and left 46 back wheels to rotate to the right about second 44 and third 48 vertical axes respectively, thereby causing battery powered motor vehicle 20 to turn sharply to the left.

In another embodiment of the invention, a method for a user to move cargo 500 using a battery powered motor vehicle 20, includes:

(a) providing a battery powered motor vehicle 20, including:
  a body 22 having a platform 24, platform 24 having a right side 26 and an opposite left side 28;
  a steering column 30 having a top end 32 and an opposite bottom end 34, bottom end 34 of steering column 30 rotatably connected to body 22, steering column 30 rotatable about a first vertical axis 36;
  a steering console 38 connected to top end 32 of steering column 30;
  a right front wheel 37 connected to right side 26 of body 22, right front wheel 37 having a right hub electric motor 39;
  a left front wheel 40 connected to left side 28 of body 22, left front wheel 40 having a left hub electric motor 41; right hub electric motor 39 mechanically and electrically independent from left hub electric motor 41;
  battery powered motor vehicle 20 power movable in either a forward or reverse direction;
  a right back wheel 42 rotatable about a second vertical axis 44;
  a left back wheel 46 rotatable about a third vertical axis 44, left back wheel 46 spaced apart from and parallel to right back wheel 42;
  a cargo rack 60 selectively connectable to battery powered motor vehicle 20;

(b) connecting cargo rack 60 to battery powered motor vehicle 20 thereby converting battery powered motor vehicle 20 into a hand truck;

(c) placing cargo 500 upon platform 24;

(d) tilting battery powered motor vehicle 20 so that right 42 and left 46 back wheels are off of the ground;

(e) the user grasping steering console 38 and causing battery powered motor vehicle 20 to move in the reverse direction (wheels 37 and 40 rotating in a reverse direction); and, (e) the user walking behind battery powered motor vehicle 20 to transport cargo 500 to a desired location.

In another embodiment of the invention, a method for a user to move cargo using a battery powered motor vehicle in an unpowered state, comprising:

(a) providing a battery powered motor vehicle 20, including:
  a body 22 having a platform 24, platform 24 having a right side 26 and an opposite left side 28;
  a steering column 30 having a top end 32 and an opposite bottom end 34, bottom end 34 of steering column 30 rotatably connected to body 22, steering column 30 rotatable about a first vertical axis 36;
  a steering console 38 connected to top end 32 of steering column 30;
  a right front wheel 37 connected to right side 26 of body 22, right front wheel 37 having a right hub electric motor 39;
  a left front wheel 40 connected to left side 40 of body 22, left front wheel 40 having a left hub electric motor 41; right hub electric motor 39 mechanically and electrically independent from left hub electric motor 41;
  battery powered motor vehicle 20 having a neutral state wherein right 39 and left 41 front wheels freely rotate in either a forward or reverse direction;
  a right back wheel 42 rotatable about a second vertical axis 44;
  a left back wheel 46 rotatable about a third vertical axis 48, left back wheel 46 spaced apart from and parallel to right back wheel 42;
  a cargo rack 60 selectively connectable to battery powered motor vehicle 20;

(b) connecting cargo rack 60 to battery powered motor vehicle 20 thereby converting battery powered motor vehicle 20 into a hand truck;

(c) placing cargo 500 upon platform 24;

(d) tilting battery powered motor vehicle 20 so that right 42 and left 46 back wheels are off of the ground;

(e) the user grasping steering console 38 and causing battery powered motor vehicle 20 to be in the neutral state; and, (e) the user and walking behind battery powered motor vehicle 20 and pushing battery powered motor vehicle 20 in a reverse direction to transport cargo 500 to a desired location.

The preferred embodiments of the invention described herein are exemplary and numerous modifications, variations, and rearrangements can be readily envisioned to achieve an equivalent result, all of which are intended to be embraced within the scope of the appended claims.

I claim:

1. A method for steering a battery powered motor vehicle, comprising:

(a) providing a battery powered motor vehicle, including:
  a body having a platform for a rider to stand upon, said platform having a right side and an opposite left side;
  a steering column having a top end and an opposite bottom end, said bottom end of said steering column rotatably connected to said body, said steering column rotatable about a first vertical axis;
  a steering console connected to said top end of said steering column;
  a right front wheel connected to said right side of said body, said right front wheel having a right hub electric motor;
  a left front wheel connected to said left side of said body, said left front wheel having a left hub electric motor; said right hub electric motor mechanically and electrically independent from said left hub electric motor;
  a right back wheel rotatable about a second vertical axis;
  a left back wheel rotatable about a third vertical axis, said left back wheel spaced apart from and parallel to said right back wheel;
  said right and left back wheels mechanically linked to said steering column so that when said steering column is rotated to the right about said first vertical axis, said right and left back wheels rotate to the left about said second and third vertical axes respectively, and when said steering column is rotated to the left about said first vertical axis, said right and left back wheels rotate to the right about said second and third vertical axes respectively;

said battery powered motor vehicle power movable in either a forward or reverse direction;

(b) causing said battery powered motor vehicle to move in said forward direction;

(c) the rider performing at least one of the following four maneuvers:

(1) placing a majority of the riders's weight upon said right side of said platform, thereby causing an increased mechanical load to be placed on said right hub electric motor and a decreased mechanical load to be placed on said left hub electric motor, thereby causing said battery powered motor vehicle to turn gradually to the right;

(2) placing a majority of the riders's weight upon said left side of said platform, thereby causing an increased mechanical load to be placed on said left hub electric motor and a decreased mechanical load to be placed on said right hub electric motor, thereby causing said battery powered motor vehicle to turn gradually to the left;

(3) turning said steering console to the right wherein said steering column rotates to the right about said first vertical axis causing said right and left back wheels to rotate to the left about said second and third vertical axes respectively, thereby causing said battery powered motor vehicle to turn sharply to the right; and, (4) turning said steering console to the left wherein said steering column rotates to the left about said first vertical axis causing said right and left back wheels to rotate to the right about said second and third vertical axes respectively, thereby causing said battery powered motor vehicle to turn sharply to the left.

2. A method for a user to move cargo using a battery powered motor vehicle, comprising:

(a) providing a battery powered motor vehicle, including:
a body having a platform, said platform having a right side and an opposite left side;
a steering column having a top end and an opposite bottom end, said bottom end of said steering column rotatably connected to said body, said steering column rotatable about a first vertical axis;
a steering console connected to said top end of said steering column;
a right front wheel connected to said right side of said body, said right front wheel having a right hub electric motor;
a left front wheel connected to said left side of said body, said left front wheel having a left hub electric motor; said right hub electric motor mechanically and electrically independent from said left hub electric motor;
said battery powered motor vehicle power movable in either a forward or reverse direction;
a right back wheel rotatable about a second vertical axis;
a left back wheel rotatable about a third vertical axis, said left back wheel spaced apart from and parallel to said right back wheel;
a cargo rack selectively connectable to said battery powered motor vehicle;

(b) connecting said cargo rack to said battery powered motor vehicle thereby converting said battery powered motor vehicle into a hand truck;

(c) placing cargo upon said platform;

(d) tilting said battery powered motor vehicle so that said right and left back wheels are off of the ground;

(e) the user grasping said steering console and causing said battery powered motor vehicle to move in said reverse direction; and, (f) the user walking behind said battery powered motor vehicle to transport said cargo to a desired location.

3. A method for a user to move cargo using a battery powered motor vehicle, comprising:

(a) providing a battery powered motor vehicle, including:
a body having a platform, said platform having a right side and an opposite left side;
a steering column having a top end and an opposite bottom end, said bottom end of said steering column rotatably connected to said body, said steering column rotatable about a first vertical axis;
a steering console connected to said top end of said steering column;
a right front wheel connected to said right side of said body, said right front wheel having a right hub electric motor;
a left front wheel connected to said left side of said body, said left front wheel having a left hub electric motor; said right hub electric motor mechanically and electrically independent from said left hub electric motor;
said battery powered motor vehicle having a neutral state wherein said right and left front wheels freely rotate in either a forward or reverse direction;
a right back wheel rotatable about a second vertical axis;
a left back wheel rotatable about a third vertical axis, said left back wheel spaced apart from and parallel to said right back wheel;
a cargo rack selectively connectable to said battery powered motor vehicle;

(b) connecting said cargo rack to said battery powered motor vehicle thereby converting said battery powered motor vehicle into a hand truck;

(c) placing cargo upon said platform;

(d) tilting said battery powered motor vehicle so that said right and left back wheels are off of the ground;

(e) the user grasping said steering console and causing said battery powered motor vehicle to be in said neutral state; and, (f) the user walking behind said battery powered motor vehicle and pushing said battery powered motor vehicle in a reverse direction to transport said cargo to a desired location.

4. A battery powered motor vehicle for transporting a rider, comprising:

a body having a platform for a rider to stand upon, said platform having a right side and an opposite left side;
a steering column having a top end and an opposite bottom end, said bottom end of said steering column rotatably connected to said body, said steering column rotatable about a first vertical axis;
a steering console connected to said top end of said steering column;
a right front wheel connected to said right side of said body, said right front wheel having a right hub electric motor;
a left front wheel connected to said left side of said body, said left front wheel having a left hub electric motor; said right hub electric motor mechanically and electrically independent from said left hub electric motor;
a right back wheel rotatable about a second vertical axis;

a left back wheel rotatable about a third vertical axis, said left back wheel spaced apart from and parallel to said right back wheel;

said right and left back wheels mechanically linked to said steering column so that when said steering column is rotated to the right about said first vertical axis, said right and left back wheels rotate to the left about said second and third vertical axes respectively, and when said steering column is rotated to the left about said first vertical axis, said right and left back wheels rotate to the right about said second and third vertical axes respectively;

said battery powered motor vehicle power movable in either a forward or reverse direction;

wherein when said battery powered motor vehicle is moving forward, the rider may selectively place a majority of his/her weight upon said right side of said platform, thereby causing an increased mechanical load to be placed on said right hub electric motor and a decreased mechanical load to be placed on said left hub electric motor, thereby causing said battery powered motor vehicle to turn gradually to the right;

wherein when said battery powered motor vehicle is moving forward, the rider may selectively place a majority of his/her weight upon said left side of said platform, thereby causing an increased mechanical load to be placed on said left hub electric motor and a decreased mechanical load to be placed on said right hub electric motor, thereby causing said battery powered motor vehicle to turn gradually to the left;

wherein when said battery powered motor vehicle is moving forward, the rider may selectively turn said steering console to the right wherein said steering column rotates to the right about said first vertical axis causing said right and left back wheels to rotate to the left about said second and third vertical axes respectively, thereby causing said battery powered motor vehicle to turn sharply to the right; and, wherein when said battery powered motor vehicle is moving forward, the rider may selectively turn said steering console to the left wherein said steering column rotates to the left about said first vertical axis causing said right and left back wheels to rotate to the right about said second and third vertical axes respectively, thereby causing said battery powered motor vehicle to turn sharply turn to the left.

5. The battery powered motor vehicle according to claim 3, further including:

said body having a rear portion; and, when said battery powered motor vehicle is not moving, said steering column selectively positionable with respect to said body from a substantially vertical position to a substantially horizontal position wherein said steering column is directed toward said rear portion of said body.

6. A battery powered motor vehicle for either transporting a rider or for transporting cargo, comprising:

a body having a platform for a rider to stand upon, said platform having a right side and an opposite left side;

a steering column having a top end and an opposite bottom end, said bottom end of said steering column rotatably connected to said body, said steering column rotatable about a first vertical axis;

a steering console connected to said top end of said steering column;

a right front wheel connected to said right side of said body, said right front wheel having a right hub electric motor;

a left front wheel connected to said left side of said body, said left front wheel having a left hub electric motor; said right hub electric motor mechanically and electrically independent from said left hub electric motor;

a right back wheel rotatable about a second vertical axis;

a left back wheel rotatable about a third vertical axis, said left back wheel spaced apart from and parallel to said right back wheel;

said right and left back wheels mechanically linked to said steering column so that when said steering column is rotated to the right about said first vertical axis, said right and left back wheels rotate to the left about said second and third vertical axes respectively, and when said steering column is rotated to the left about said first vertical axis, said right and left back wheels rotate to the right about said second and third vertical axes respectively;

said battery powered motor vehicle power movable in either a forward or reverse direction;

wherein when said battery powered motor vehicle is moving forward, the rider may selectively place a majority of his/her weight upon said right side of said platform, thereby causing an increased mechanical load to be placed on said right hub electric motor and a decreased mechanical load to be placed on said left hub electric motor, thereby causing said battery powered motor vehicle to turn gradually to the right;

wherein when said battery powered motor vehicle is moving forward, the rider may selectively place a preponderance of the his/her weight upon said left side of said platform, thereby causing an increased mechanical load to be placed on said left hub electric motor and a decreased mechanical load to be placed on said right hub electric motor, thereby causing said battery powered motor vehicle to turn gradually to the left;

wherein when said battery powered motor vehicle is moving forward, the rider may selectively turn said steering console to the right wherein said steering column rotates to the right about said first vertical axis causing said right and left back wheels to rotate to the left about said second and third vertical axes respectively, thereby causing said battery powered motor vehicle to turn sharply to the right;

wherein when said battery powered motor vehicle is moving forward, the rider may selectively turn said steering console to the left wherein said steering column rotates to the left about said first vertical axis causing said right and left back wheels to rotate to the right about said second and third vertical axes respectively, thereby causing said battery powered motor vehicle to turn sharply turn to the left;

a cargo rack selectively connectable to said battery powered motor vehicle for converting said battery powered motor vehicle into a hand truck, wherein when said cargo rack is connected to said battery powered motor vehicle, a user may (1) place cargo upon said platform, (2) tilt said battery powered motor vehicle so that said right and left back wheels are off of the ground, (3) grasp said steering console and cause said battery powered motor vehicle to move in said reverse direction, and (4) walk behind said battery powered motor vehicle to transport said cargo to a desired location.

7. The battery powered motor vehicle according to claim 3, further including:
   said body having a rear portion; and,
   when said battery powered motor vehicle is not moving, said steering column selectively positionable with respect to said body from a substantially vertical position to a substantially horizontal position wherein said steering column is directed toward said rear portion of said body.

* * * * *

UNITED STATES PATENT AND TRADEMARK OFFICE
CERTIFICATE OF CORRECTION

PATENT NO. : 6,907,949 B1
DATED : June 21, 2005
INVENTOR(S) : John Baron Wang

It is certified that error appears in the above-identified patent and that said Letters Patent is hereby corrected as shown below:

Column 11,
Lines 48 and 49, delete "claim 3", insert -- claim 4 --.

Column 13,
Lines 1 and 2, delete "claim 3", insert -- claim 6 --.

Signed and Sealed this

Thirteenth Day of September, 2005

JON W. DUDAS
*Director of the United States Patent and Trademark Office*